(12) United States Patent
Zaima et al.

(10) Patent No.: US 12,456,498 B2
(45) Date of Patent: Oct. 28, 2025

(54) DISK DEVICE WITH FILTERS ARRANGED IN FILTER UNIT CONFIGURATIONS

(71) Applicants: Kabushiki Kaisha Toshiba, Tokyo (JP); Toshiba Electronic Devices & Storage Corporation, Tokyo (JP)

(72) Inventors: Shino Zaima, Kamakura Kanagawa (JP); Akiyo Mizutani, Kawasaki Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/428,988

(22) Filed: Jan. 31, 2024

(65) Prior Publication Data

US 2025/0104741 A1    Mar. 27, 2025

(30) Foreign Application Priority Data

Sep. 21, 2023  (JP) ................ 2023-156031

(51) Int. Cl.
  G11B 33/14  (2006.01)
  G11B 25/04  (2006.01)
  G11B 33/02  (2006.01)

(52) U.S. Cl.
  CPC .......... *G11B 33/146* (2013.01); *G11B 25/043* (2013.01); *G11B 33/027* (2013.01); *G11B 33/1446* (2013.01); *G11B 33/1453* (2013.01)

(58) Field of Classification Search
  None
  See application file for complete search history.

(56) References Cited

U.S. PATENT DOCUMENTS

| 5,075,807 | A | 12/1991 | Inoue et al. | |
|---|---|---|---|---|
| 5,764,435 | A | 6/1998 | Sugimoto et al. | |
| 6,618,222 | B1* | 9/2003 | Watkins et al. | G11B 33/14 360/97.18 |
| 7,209,319 | B1* | 4/2007 | Watkins et al. | G11B 33/146 360/97.18 |
| 8,599,515 | B2 | 12/2013 | Brown | |
| 2004/0168575 | A1* | 9/2004 | Isogawa et al. | G11B 33/146 96/134 |

(Continued)

FOREIGN PATENT DOCUMENTS

JP    2022-180054 A    12/2022

*Primary Examiner* — Craig A. Renner
(74) *Attorney, Agent, or Firm* — Kim & Stewart LLP

(57) ABSTRACT

According to one embodiment, a disk device includes a magnetic disk, a housing, a first filter unit, and a second filter unit. The housing is provided with an internal space and is provided with a first through hole. The first filter unit includes a first case with a first accommodation space which is in communication with the first through hole, a first adsorbent in the first accommodation space, and a first filter. The first accommodation space is in communication with the internal space through the first filter. The second filter unit includes a second case with a second accommodation space which is separated from the first accommodation space, a second adsorbent in the second accommodation space, and a second filter. The second accommodation space is in communication with the internal space through the second filter.

15 Claims, 6 Drawing Sheets

(56) References Cited

U.S. PATENT DOCUMENTS

| | | | |
|---|---|---|---|
| 2005/0168868 A1* | 8/2005 | Shin et al. | G11B 33/1446 360/97.18 |
| 2005/0241483 A1* | 11/2005 | Okada et al. | B01D 53/28 96/134 |
| 2006/0032372 A1* | 2/2006 | Dauber et al. | G11B 33/146 96/134 |
| 2006/0081128 A1* | 4/2006 | Ball et al. | G11B 33/1446 96/121 |
| 2013/0044391 A1 | 2/2013 | Brown | |
| 2019/0066716 A1* | 2/2019 | Suzuki | G11B 33/1466 |
| 2022/0028430 A1* | 1/2022 | Mizutani | G11B 33/1453 |
| 2022/0375502 A1 | 11/2022 | Mizutani et al. | |
| 2024/0144979 A1* | 5/2024 | Sumiya et al. | G11B 33/146 |

* cited by examiner

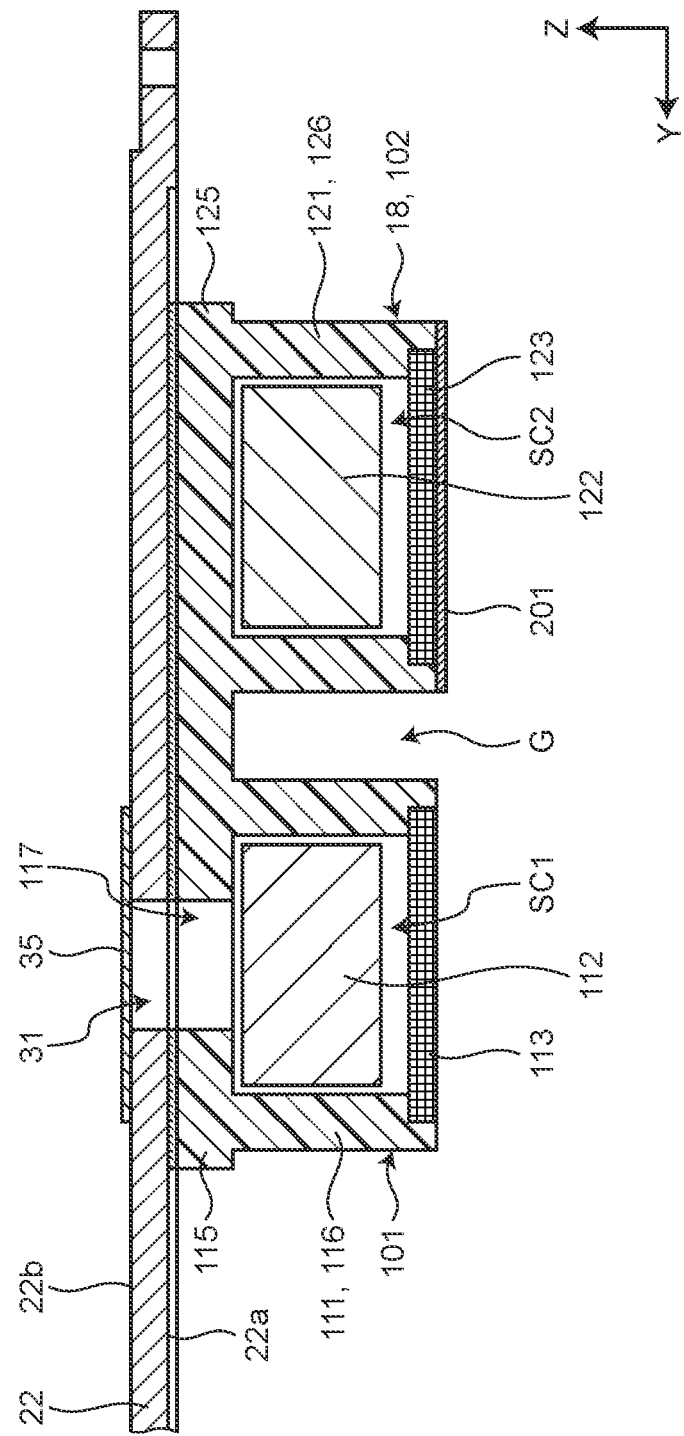

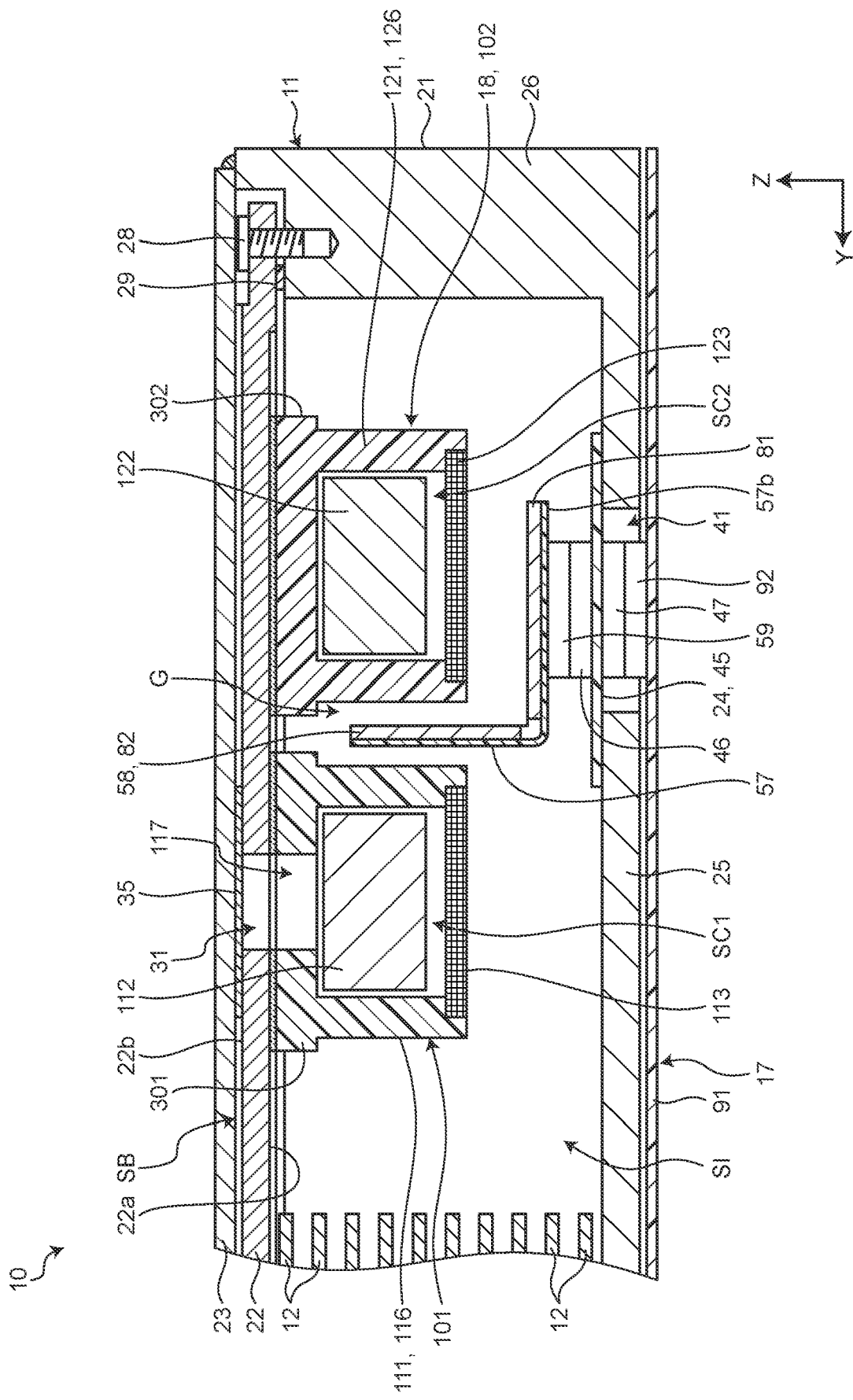

DISK DEVICE WITH FILTERS ARRANGED IN FILTER UNIT CONFIGURATIONS

CROSS-REFERENCE TO RELATED APPLICATIONS

This application is based upon and claims the benefit of priority from Japanese Patent Application No. 2023-156031, filed on Sep. 21, 2023; the entire contents of which are incorporated herein by reference.

FIELD

Embodiments described herein relate generally to a disk device.

BACKGROUND

A disk device such as a hard disk drive (HDD) generally includes a housing that accommodates various components such as magnetic disks, and an adsorbent that adsorbs predetermined substances inside the housing. The disk device may include a plurality of kinds of adsorbents.

Such adsorbents may be used for different purposes and/or may have different properties, for example. Because of this, when the different adsorbents disposed in one location are handled under the same condition, at least one of the adsorbents may deteriorate in performance.

BRIEF DESCRIPTION OF THE DRAWINGS

FIG. 5 is an exemplary cross-sectional view partially illustrating an inner cover before being attached to a base and a breather filter according to the second embodiment; and FIG. 6 is an exemplary cross-sectional view illustrating a part of an HDD according to a third embodiment.

DETAILED DESCRIPTION

According to one embodiment, a disk device includes a magnetic disk, a housing, a first filter unit, and a second filter unit. The housing includes a base and a first cover. The base is provided with an internal space in which the magnetic disk is accommodated. The first cover is provided with a first through hole and is attached to the base to close the internal space. The first filter unit includes a first case, a first adsorbent and a first filter. The first case is provided with a first accommodation space which is in communication with the first through hole. The first adsorbent is disposed in the first accommodation space. The first filter is attached to the first case which is attached to the first cover in the internal space. The first accommodation space is in communication with the internal space through the first filter. The second filter unit includes a second case, a second adsorbent and a second filter. The second case is provided with a second accommodation space which is separated from the first accommodation space. The second adsorbent is disposed in the second accommodation space. The second filter is attached to the second case which is attached to the first cover in the internal space. The second accommodation space is in communication with the internal space through the second filter.

First Embodiment

Hereinafter, a first embodiment will be described with reference to FIGS. 1 to 3. Note that, in the present specification, a component according to an embodiment and an explanation of the component may be described using a plurality of expressions. The component and the explanation thereof are examples, and are not limited by the expressions used in the present specification. The component may also be identified by a term different from those used in the present specification. In addition, the component may be explained using an expression different from those used in the present specification.

In the following description, "suppress" is defined as, for example, preventing an occurrence of an event, an action, or an influence, or reducing the degree of the event, the action, or the influence. Furthermore, in the following description, "restrict" is defined as, for example, preventing a movement or a rotation, or allowing a movement or a rotation within a predetermined range and preventing a movement or a rotation beyond the predetermined range.

Figure 1:
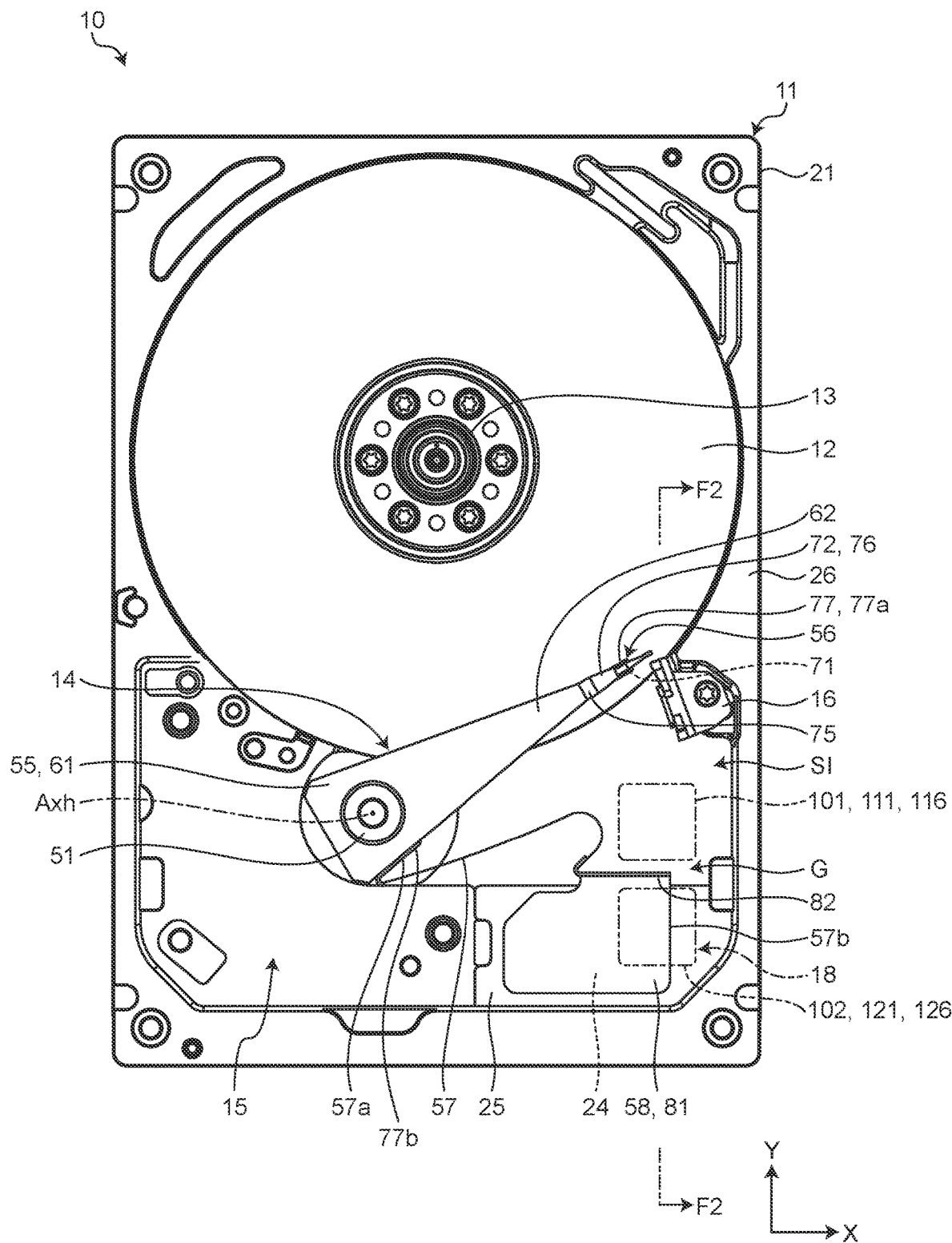
FIG. 1 is an exemplary plan view illustrating an HDD according to a first embodiment.

FIG. 1 is an exemplary plan view illustrating a hard disk drive (HDD) 10 according to a first embodiment. FIG. 2 is an exemplary cross-sectional view illustrating a part of the HDD 10 according to the first embodiment along line F2-F2 of FIG. 1. The HDD 10 is an example of a disk device, and may also be referred to as an electronic device, a storage device, an external storage device, or a magnetic disk device.

As illustrated in the drawings, in the present specification, an X axis, a Y axis, and a Z axis are defined for convenience. The X axis, the Y axis, and the Z axis are orthogonal to each other. The X axis is provided along the width of the HDD 10. The Y axis is provided along the length of the HDD 10. The Z axis is provided along the thickness of the HDD 10.

Furthermore, in the present specification, an X direction, a Y direction, and a Z direction are defined. The X direction is a direction along the X axis, and includes a +X direction indicated by an X-axis arrow and a −X direction which is an opposite direction of the X-axis arrow. The Y direction is a direction along the Y axis, and includes a +Y direction indicated by a Y-axis arrow and a −Y direction which is an opposite direction of the Y-axis arrow. The Z direction is a direction along the Z axis, and includes a +Z direction indicated by a Z-axis arrow and a −Z direction which is an opposite direction of the Z-axis arrow.

Figure 2:
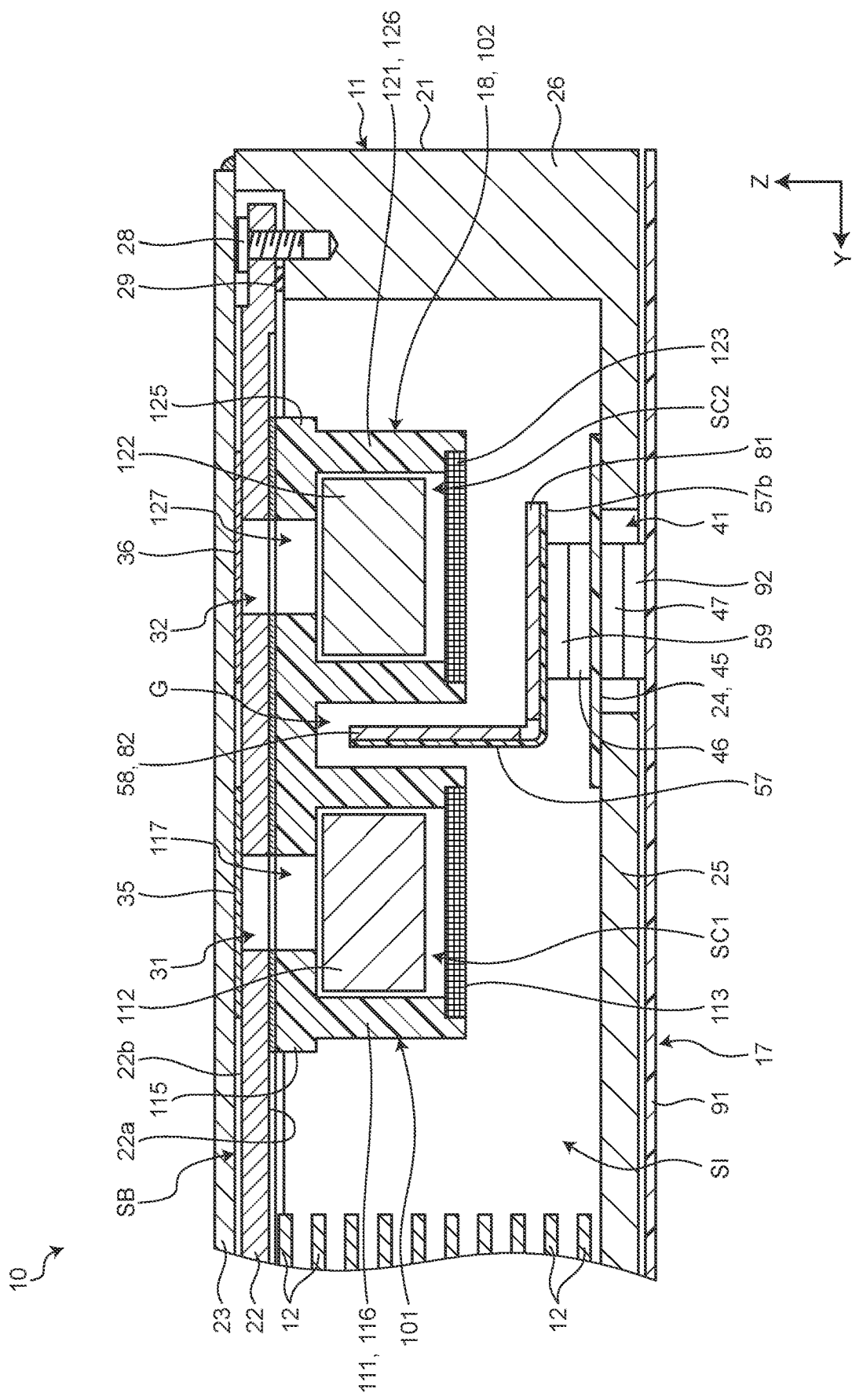
FIG. 2 is an exemplary cross-sectional view illustrating a part of the HDD according to the first embodiment along line F2-F2 of FIG. 1.

As illustrated in FIGS. 1 and 2, the HDD 10 includes a housing 11, a plurality of magnetic disks 12, a spindle motor 13, a head stack assembly (HSA) 14, a voice coil motor (VCM) 15, a ramp load mechanism 16, a printed circuit board (PCB) 17, and a breather filter 18. The magnetic disks 12 may also be referred to as disks or platters.

As illustrated in FIG. 2, the housing 11 includes a base 21, an inner cover 22, an outer cover 23, and a relay board 24. Note that the housing 11 is not limited to this example. Note that the inner cover 22 and the outer cover 23 are omitted in FIG. 1. The inner cover 22 is an example of a first cover. The outer cover 23 is an example of a second cover.

As illustrated in FIG. 1, the base 21 has a substantially rectangular parallelepiped box shape opening in the +Z direction. The base 21 has a bottom wall 25 and a side wall 26. The bottom wall 25 has a substantially rectangular (quadrangular) plate shape that expands substantially orthogonally with respect to the Z direction. The side wall 26 protrudes in the substantially +Z direction from the edge of the bottom wall 25, and has a substantially rectangular frame shape.

The base 21 has an internal space SI. The internal space SI is formed (defined or partitioned) by the bottom wall 25 and the side wall 26. The side wall 26 surrounds the internal space SI. The plurality of magnetic disks 12, the spindle motor 13, the HSA 14, the VCM 15, the ramp load mechanism 16, and the breather filter 18 are accommodated in the internal space SI.

As illustrated in FIG. 2, the inner cover 22 is attached to the base 21. For example, the inner cover 22 is attached to an end portion of the side wall 26 in the +Z direction with, for example, a screw 28. Accordingly, the inner cover 22 closes the internal space SI.

The inner cover 22 has an inner surface 22a and an outer surface 22b. The inner surface 22a faces the internal space SI, the bottom wall 25, and the end portion of the side wall 26 in the +Z direction. The outer surface 22b is opposite to the inner surface 22a.

An endless gasket 29 is interposed between the inner surface 22a of the inner cover 22 and the side wall 26. The gasket 29 airtightly seals a space between the inner cover 22 and the side wall 26. The gasket 29 is made of, for example, synthetic rubber having low helium permeability. Note that the gasket 29 may be made of another material.

The outer cover 23 covers the inner cover 22 and is attached to the base 21. This creates a space SB between the outer cover 23 and the inner cover 22. Note that the space SB may be partially filled with, for example, a double-sided tape bonding the inner cover 22 and the outer cover 23 to each other. For example, the outer cover 23 is attached to the end portion of the side wall 26 in the +Z direction by welding. As a result, the outer cover 23 airtightly closes the space SB. Note that the outer cover 23 may be omitted.

The inner cover 22 is provided with two vents 31 and 32. The vent 31 is an example of a first through hole. The vent 32 is an example of a second through hole. Each of the vents 31 and 32 penetrates through the inner cover 22 in a substantially Z direction and is open to the inner surface 22a and the outer surface 22b. In this manner, the vents 31 and 32 allow the internal space SI and the space SB to communicate with each other.

After the components are arranged in the internal space SI and the inner cover 22 is attached to the base 21, air in the internal space SI is removed from at least one of the vents 31 and 32. Furthermore, the internal space SI is filled with a gas different from air through at least one of the vents 31 and 32.

The gas filling the internal space SI is, for example, a low-density gas having a density lower than that of air, an inert gas having low reactivity, or the like. For example, the internal space SI is filled with helium. Helium is an example of a first gas. Note that the internal space SI may be filled with another fluid.

The housing 11 further includes two seals 35 and 36. The seal 35 is an example of a first seal. The seal 36 is an example of a second seal. The seals 35 and 36 are, for example, aluminum seals.

The seal 35 airtightly closes the vent 31. The seal 36 airtightly closes the vent 32. The seals 35 and 36 are attached to the outer surface 22b of the inner cover 22 in the space SB outside the internal space SI. As a result, the seals 35 and 36 restrict a leakage of the helium from the internal space SI to the outside of the housing 11 through the vents 31 and 32.

The bottom wall 25 is provided with a through hole 41. The through hole 41 penetrates through the bottom wall 25 in the substantially Z direction for communication between the internal space SI and the outside. The relay board 24 is attached to the bottom wall 25 to airtightly close the through hole 41. The relay board 24 includes a board 45 and two relay connectors 46 and 47.

The board 45 is, for example, a rigid board such as a glass epoxy board. The board 45 covers the through hole 41, and is attached to the bottom wall 25. The board 45 airtightly closes the through hole 41. The two relay connectors 46 and 47 are mounted on both surfaces of the board 45, respectively, and are electrically connected to each other.

As illustrated in FIG. 1, the plurality of magnetic disks 12 extend orthogonally with respect to the Z direction. The plurality of magnetic disks 12 are arranged at intervals in the Z direction. Magnetic recording layers are provided on both surfaces of the magnetic disks 12.

The spindle motor 13 supports the plurality of magnetic disks 12. The plurality of magnetic disks 12 are held by a hub of the spindle motor 13 using, for example, a clamp spring. The spindle motor 13 integrally rotates the plurality of magnetic disks 12.

The housing 11 further includes a support shaft 51 spaced apart from the magnetic disks 12. The support shaft 51 protrudes, for example, from the bottom wall 25 in the substantially +Z direction. The HSA 14 is rotatably supported by the support shaft 51.

The HSA 14 can rotate about the axis Axh. The axis Axh is a virtual axis extending in the substantially Z direction. The axis Axh is, for example, the center of rotation of the HSA 14 and also the axis of the support shaft 51.

The HSA 14 includes a carriage 55, a plurality of head gimbal assemblies (HGAs) 56, a flexible printed circuit board (FPC) 57, a support plate 58, and a relay connector 59 of FIG. 2. That is, the FPC 57 is located in the internal space SI. As illustrated in FIG. 1, the carriage 55 includes an actuator block 61 and a plurality of arms 62.

The actuator block 61 is attached to the support shaft 51 via a bearing in such a manner as to be rotatable about, for example, the axis Axh. The plurality of arms 62 protrude from the actuator block 61 substantially in parallel in a direction substantially orthogonal to the axis Axh.

Each of the plurality of HGAs 56 includes a magnetic head 71 and a suspension 72. The magnetic head 71 may also be referred to as a slider. The magnetic head 71 records and reproduces information on and from a corresponding one of the plurality of magnetic disks 12. In other words, the magnetic head 71 reads and writes information from and to the magnetic disk 12. The suspension 72 is attached to the arm 62, and holds the magnetic head 71.

The suspension 72 includes a base plate 75, a load beam 76, and a flexure 77. The base plate 75 is attached to a distal end of the arm 62. The load beam 76 is plate-like in a thinner thickness than the base plate 75. The load beam 76 is attached to the base plate 75 in such a manner as to extend from the base plate 75.

The flexure 77 is a flexible printed wiring board of an elongated band form. The flexure 77 includes, for example, a metallic backing plate, an insulating base layer, a conductive layer, and an insulating cover layer.

The flexure 77 extends along the arm 62, the base plate 75, and the load beam 76. A rotatable gimbal is provided at one end portion 77a of the flexure 77. The magnetic head 71 is attached to the gimbal of the flexure 77.

One end portion 57a of the FPC 57 is attached to the actuator block 61. The other end portion 77b of each of the plurality of flexures 77 is connected to the end portion 57a of the FPC 57. In this manner, the flexure 77 electrically connects the magnetic head 71 and the FPC 57 to each other.

The other end portion 57b of the FPC 57 is attached to the support plate 58. The support plate 58 is made of, for example, metal or synthetic resin. The support plate 58 has a higher rigidity than the FPC 57. The support plate 58 includes an attachment part 81 and an upright part 82.

The attachment part 81 is disposed along the bottom wall 25 of the base 21, and is attached to the bottom wall 25 with, for example, a screw. The end portion 57b of the FPC 57 is attached to the attachment part 81. As illustrated in FIG. 2, the relay connector 59 is mounted on the end portion 57b. The attachment part 81 reinforces the end portion 57b of the FPC 57 on which the relay connector 59 is mounted. The relay connector 59 is connected to the relay connector 46 of the relay board 24.

The upright part 82 extends in the substantially Z direction from the attachment part 81. The upright part 82 supports the FPC 57 in such a manner that the width of the FPC 57 substantially coincides with the Z direction between the two end portions 57a and 57b. The upright part 82 is disposed, for example, along an X-Z plane. Note that the upright part 82 is not limited to this example.

The VCM 15 includes a voice coil, a pair of yokes, and magnets provided on the yokes. The voice coil is held by the actuator block 61. The VCM 15 moves the magnetic head 71 to a desired position by rotating the carriage 55 around the axis Axh.

When the magnetic head 71 moves to an outer edge of the magnetic disk 12 according to the rotation of the HSA 14 by the VCM 15, the ramp load mechanism 16 of FIG. 1 holds the magnetic head 71 apart from the magnetic disk 12.

As illustrated in FIG. 2, the PCB 17 is disposed outside the internal space SI and attached to the bottom wall 25. The PCB 17 includes a printed wiring board (PWB) 91 and a relay connector 92. The PWB 91 is, for example, a rigid board such as a glass epoxy board, and is a multilayer board, a build-up board, or the like.

The relay connector 92 is mounted on the PWB 91. The relay connector 92 is connected to the relay connector 47 of the relay board 24. As a result, the PCB 17 is electrically connected to the magnetic head 71 through the relay board 24, the FPC 57, and the flexure 77.

The PCB 17 further includes various electronic components mounted on the PWB 91, such as an interface (I/F) connector connected to a host computer and a controller that controls the operation of the HDD 10. The controller of the PCB 17 controls the spindle motor 13, the VCM 15, and the magnetic head 71 through the relay connectors 92, 47, 46, and 59.

The breather filter 18 is attached to the inner cover 22. The breather filter 18 includes a first filter unit 101 and a second filter unit 102. Note that the breather filter 18 may include three or more filter units.

The first filter unit 101 includes a first case 111, a first adsorbent 112, and a first filter 113. In the present embodiment, the first filter unit 101 includes a single first adsorbent 112 and a single first filter 113. Note that the first filter unit 101 is not limited to this example.

The first case 111 is made of, for example, synthetic resin or metal having low helium permeability. The first case 111 has a first base 115 and a first peripheral wall 116. The first peripheral wall 116 is an example of a first wall.

The first base 115 is of a plate form disposed along the inner surface 22a of the inner cover 22. The first base 115 is attached to the inner surface 22a with, for example, a double-sided tape or an adhesive. That is, the first case 111 is attached to the inner cover 22 in the internal space SI.

The first base 115 is attached to the inner cover 22 to cover the vent 31. The first base 115 is provided with a first communication hole 117. The first communication hole 117 communicates with the vent 31.

The first peripheral wall 116 is a cylindrical wall protruding in the substantially −Z direction from the first base 115. The first peripheral wall 116 has a first accommodation space SC1 inside. That is, the first accommodation space SC1 is included in the first case 111.

The first adsorbent 112 is disposed in the first accommodation space SC1. Therefore, the first peripheral wall 116 surrounds the first adsorbent 112. In the present embodiment, the first adsorbent 112 is, for example, a moisture absorbent such as silica gel. Therefore, the first adsorbent 112 adsorbs moisture.

For example, when the silica gel is heated to above a predetermined temperature, the silica gel releases the adsorbed moisture to be able to absorb moisture again. That is, the adsorption action of the first adsorbent 112 is regenerable or reactivatable. The predetermined temperature is, for example, about 80° C. or lower. Note that the adsorption action of silica gel may not be completely regenerable at 80° C. or lower.

The first filter 113 is, for example, a membrane filter. The first filter 113 is attached to an end portion of the first peripheral wall 116 in the −Z direction, and closes the first accommodation space SC1. That is, the first filter 113 is attached to the first case 111.

The first communication hole 117 allows communication between the vent 31 and an end portion of the first accommodation space SC1 in the +Z direction. That is, the first accommodation space SC1 communicates with the vent 31 through the first communication hole 117. Further, an end portion of the first accommodation space SC1 in the −Z direction communicates with the internal space SI through the first filter 113. Thus, the first adsorbent 112 in the first accommodation space SC1 adsorbs the moisture of a gas while moving between the internal space SI and the outside through the vent 31.

The second filter unit 102 includes a second case 121, a second adsorbent 122, and a second filter 123. In the present embodiment, the second filter unit 102 includes a single second adsorbent 122 and a single second filter 123. Note that the second filter unit 102 is not limited to this example.

The second case 121 is made of, for example, synthetic resin or metal having low helium permeability. The second case 121 has a second base 125 and a second peripheral wall 126. The second peripheral wall 126 is an example of a second wall.

The second base 125 is of a plate form disposed along the inner surface 22a of the inner cover 22. The second base 125 is attached to the inner surface 22a with, for example, a double-sided tape or an adhesive. That is, second case 121 is attached to the inner cover 22 in the internal space SI. In the present embodiment, the first base 115 of the first case 111 and the second base 125 of the second case 121 are integrated together.

The second base 125 is attached to the inner cover 22 to cover the vent 32. The second base 125 is provided with a second communication hole 127. The second communication hole 127 communicates with the vent 32.

The second peripheral wall 126 is a cylindrical wall protruding in the substantially −Z direction from the second base 125. A second accommodation space SC2 is provided inside the second peripheral wall 126. That is, the second case 121 is provided with the second accommodation space SC2.

The second adsorbent 122 is disposed in the second accommodation space SC2. As such, the second peripheral wall 126 surrounds the second adsorbent 122. In the present embodiment, the second adsorbent 122 is, for example, a gas adsorbent such as activated carbon. Thus, the first adsorbent 112 and the second adsorbent 122 are different kinds of absorbents. The second adsorbent 122 adsorbs various organic substances including gases. The gas adsorbed by the activated carbon is an example of a second gas. The activated carbon as the second adsorbent 122 can also adsorb moisture.

In the present embodiment, a rate of adsorption of the first adsorbent 112 exceeds a rate of adsorption of the second adsorbent 122. The rate of adsorption is a mass of substances adsorbed by a unit mass of an adsorbent per unit time. Note that the rates of adsorption of the first adsorbent 112 and the second adsorbent 122 are not limited to this example.

The second filter 123 is, for example, a membrane filter. The second filter 123 is attached to a −Z directional end of the second peripheral wall 126 to close the second accommodation space SC2. That is, the second filter 123 is attached to the second case 121.

The second communication hole 127 allows communication between the vent 32 and a +Z directional end of the second accommodation space SC2. That is, the second accommodation space SC2 communicates with the vent 32 through the second communication hole 127. Further, a −Z directional end of the second accommodation space SC2 communicates with the internal space SI through the second filter 123. As such, the second adsorbent 122 in the second accommodation space SC2 adsorbs various organic substances from a gas while moving between the internal space SI and the outside through the vent 32.

The first filter unit 101 and the second filter unit 102 are aligned in the substantially Y direction. The second peripheral wall 126 is spaced apart from the first peripheral wall 116 with a gap G therebetween in the substantially −Y direction. The second accommodation space SC2 is thus separated from the first accommodation space SC1.

The first accommodation space SC1 and the second accommodation space SC2 are not in direct communication with each other. Specifically, the first accommodation space SC1 and the second accommodation space SC2 communicate with each other via the first filter 113, the internal space SI, and the second filter 123. However, the first accommodation space SC1 and the second accommodation space SC2 are separated from each other by the first peripheral wall 116, the gap G, and the second peripheral wall 126.

The first accommodation space SC1 and the second accommodation space SC2 are independent from each other, and individually communicate with the internal space SI. Therefore, for example, a gas supply to the vent 31 flows into the internal space SI through the first accommodation space SC1 without passing through the second accommodation space SC2. A gas supply to the vent 32 flows into the internal space SI through the second accommodation space SC2 without passing through the first accommodation space SC1.

The upright part 82 of the support plate 58 and a part of the FPC 57 supported by the upright part 82 are located in the gap G. Therefore, the part of the FPC 57 is located between the first peripheral wall 116 and the second peripheral wall 126. In addition, the first peripheral wall 116 is located between the magnetic disk 12 and the FPC 57.

Hereinafter, a part of a method for manufacturing the HDD 10 according to the first embodiment will be exemplified. Note that the method of manufacturing the HDD 10 is not limited to the method to be described below, and another method may be used. First, the plurality of magnetic disks 12, the spindle motor 13, the HSA 14, the VCM 15, and the ramp load mechanism 16 are accommodated in the internal space SI. The magnetic disks 12, the spindle motor 13, the HSA 14, the VCM 15, and the ramp load mechanism 16 are assembled to be operable as the HDD 10.

Figure 3:
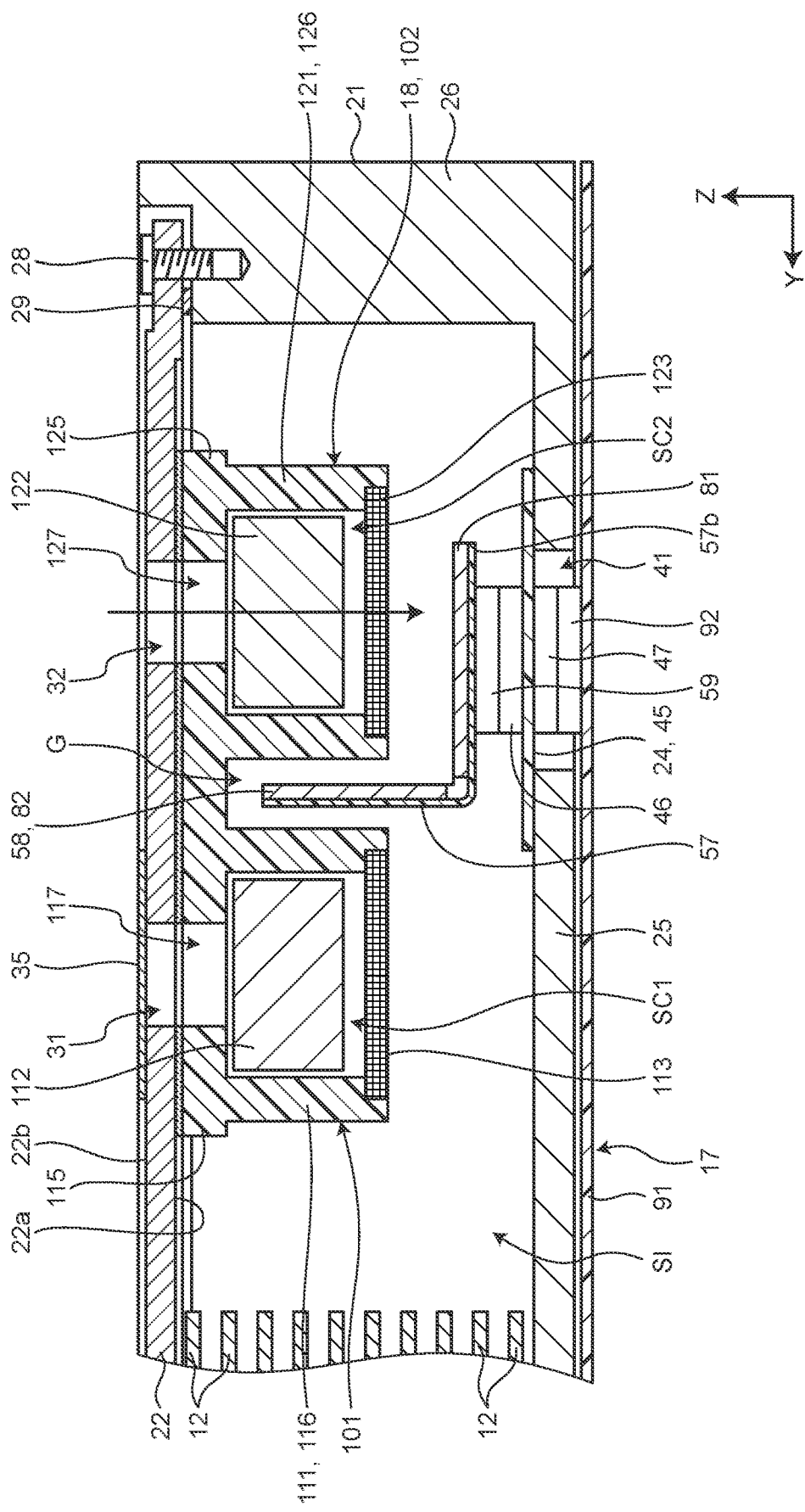
FIG. 3 is an exemplary cross-sectional view partially illustrating an inner cover attached to a base and a breather filter according to the first embodiment.

FIG. 3 is an exemplary cross-sectional view partially illustrating the inner cover 22 attached to the base 21 and the breather filter 18 in the first embodiment. First, the inner cover 22 is attached to the base 21 by, for example, a screw 28.

Next, the seal 35 or the seal 36 is peeled off from the inner cover 22. In the example of FIG. 3, the seal 36 is peeled off from the inner cover 22. As a result, the internal space SI communicates with the outside through the second filter 123, the second accommodation space SC2, the second communication hole 127, and the vent 32. Note that, with no seals 35 and 36 attached to the inner cover 22, the seal 35 may be attached to the inner cover 22.

Next, air in the internal space SI is removed through the second filter 123, the second accommodation space SC2, the second communication hole 127, and the vent 32. Furthermore, the internal space SI is filled with helium through the vent 32, the second communication hole 127, the second accommodation space SC2, and the second filter 123. Note that air may be discharged from the internal space SI by filling the internal space SI with helium.

Next, the seal 36 is attached to the inner cover 22. As a result, the vent 32 is sealed by the seal 36. The vent 32 is airtightly sealed by the seal 36. Furthermore, a gap between the base 21 and the inner cover 22 is airtightly sealed by the gasket 29. As a result, a leakage of helium from the internal space SI is prevented at least temporarily.

Next, the outer cover 23 is joined to the side wall 26 of the base 21 by, for example, welding. As a result, the outer cover 23 covering the inner cover 22 is fixed to the base 21. Note that, before the outer cover 23 is attached to the base 21, an operation of the HDD 10 and a leakage of helium may be inspected.

By joining the outer cover 23 to the base 21, a space SB is formed between the inner cover 22 and the outer cover 23. A trace amount of air or a shielding gas used for welding may be present in the space SB. The seals 35 and 36 and the gasket 29 suppress a flow of the air or the shielding gas in the space SB into the internal space SI. In this manner, the manufacture of the HDD 10 is completed.

When the magnetic disk 12 and the HSA 14 rotate in the internal space SI, an airflow is generated. As illustrated in FIG. 1, since the first peripheral wall 116 is located between the magnetic disk 12 and the FPC 57, the first peripheral wall 116 is exposed to the generated airflow. In other words, helium in the internal space SI flows relatively fast around the first filter unit 101. Therefore, the airflow easily moves between the internal space SI and the first accommodation space SC1 through the first filter 113.

The airflow circulates between the internal space SI and the first accommodation space SC1. Helium passes relatively quickly through the first adsorbent 112 arranged in the first accommodation space SC1. Since the first adsorbent 112 has a relatively high rate of adsorption, moisture can be efficiently adsorbed by the passing helium.

On the other hand, the upright part 82 of the support plate 58 and a part of the FPC 57 supported by the upright part 82 are located between the magnetic disk 12 and the second peripheral wall 126. Therefore, the upright part 82 and the FPC 57 block the airflow, and helium tends to stay around the second filter unit 102.

Helium passes relatively slowly through the second adsorbent 122 arranged in the second accommodation space SC2. However, the second adsorbent 122 has a relatively low rate of adsorption. Therefore, even though the speed of helium passing through the second adsorbent 122 is slow, the efficiency of the adsorption action of the second adsorbent 122 hardly decreases. That is, the first adsorbent 112 and the second adsorbent 122 can adsorb moisture and organic substances in an efficient manner on the whole.

In the HDD 10 according to the first embodiment described above, the housing 11 includes a base 21 and an inner cover 22. The base 21 is provided with an internal space SI in which the magnetic disk 12 is accommodated. The inner cover 22 with a vent 31 is attached to the base 21 to close the internal space SI. The first filter unit 101 includes a first case 111, a first adsorbent 112, and a first filter 113. The first case 111 is provided with a first accommodation space SC1. The first adsorbent 112 is disposed in the first accommodation space SC1. The first filter 113 is attached to the first case 111. The first case 111 is attached to the inner cover 22 in the internal space SI. The first accommodation space SC1 is in communication with the vent 31, and in communication with the internal space SI through the first filter 113. The second filter unit 102 includes a second case 121, a second adsorbent 122, and a second filter 123. The second case 121 is provided with a second accommodation space SC2. The second adsorbent 122 is disposed in the second accommodation space SC2. The second filter 123 is attached to the second case 121. The second case 121 is attached to the inner cover 22 in the internal space SI. The second accommodation space SC2 is separated from the first accommodation space SC1 and in communication with the internal space SI through the second filter 123.

The first accommodation space SC1 is in communication with the second accommodation space SC2 through the first filter 113, the internal space SI, and the second filter 123. In other words, the first accommodation space SC1 and the second accommodation space SC2 are separated and independent from each other, and individually communicate with the internal space SI. Because of this, the HDD 10 according to the present embodiment can avoid or restrict the first adsorbent 112 and the second adsorbent 122 from contacting and affecting each other. For example, the HDD 10 can avoid or reduce such a situation that the second adsorbent 122 deteriorates in performance due to a substance or substances adsorbed by the first adsorbent 112.

In the present embodiment the first adsorbent 112 is silica gel, and the second adsorbent 122 is activated carbon, for example. If the activated carbon is in the vicinity of the silica gel, the moisture adsorbed by the silica gel may decrease the activated carbon in adsorption efficiency. Further, the moisture may occlude the adsorption sites of the activated carbon. However, in the present embodiment, since the first accommodation space SC1 accommodating the first adsorbent 112 and the second accommodation space SC2 accommodating the second adsorbent 122 are separated from each other, it may be less likely that the adsorption action of the activated carbon is affected by the moisture adsorbed by the silica gel.

The first adsorbent 112 and the second adsorbent 122 are different kinds of adsorbents. The HDD 10 according to the present embodiment can avoid the first adsorbent 112 and the second adsorbent 122 of different kinds from affecting each other.

The internal space SI is filled with a gas different from air. For example, the internal space SI is filled with helium. The first adsorbent 112 and the second adsorbent 122 can remove moisture and other gases from the helium. As a result, the HDD 10 can avoid or lower the possibility that the magnetic head 71 is crashed due to, for example, moisture or a contaminant gas.

The housing 11 further includes an outer cover 23 attached to the base 21 to cover the inner cover 22. The outer cover 23 closes a space SB between the outer cover 23 and the inner cover 22 in an airtight manner. As a result, the HDD 10 according to the present embodiment can prevent the first adsorbent 112 from being exposed to ambient air through the vent 31.

A seal 35 is attached to the inner cover 22 outside the internal space SI to close the vent 31 in an airtight manner. Thereby, the HDD 10 according to the present embodiment can prevent the first adsorbent 112 from being exposed to ambient air through the vent 31.

The first case 111 and the second case 121 are integrated together. This allows the first filter unit 101 and the second filter unit 102 to be attached to the inner cover 22 through a single process, facilitating the assembly of the HDD 10.

The FPC 57 is located in the internal space SI. The first case 111 has a first peripheral wall 116 surrounding the first adsorbent 112. The second case 121 has a second peripheral wall 126 surrounding the second adsorbent 122. The second case 121 is spaced apart from the first peripheral wall 116 with a gap G therebetween. The FPC 57 is located in the gap G. As a result, the HDD 10 according to the present embodiment allows more flexible arrangement of the first filter unit 101, the second filter unit 102, and the FPC 57 in the internal space SI, leading to an efficient use of the internal space SI.

The first peripheral wall 116 is located between the magnetic disk 12 and the FPC 57. The FPC 57 is located between the first peripheral wall 116 and the second peripheral wall 126. The first adsorbent 112 has a higher rate of adsorption than the second adsorbent 122. The first peripheral wall 116 is more easily exposed to airflow generated by the rotating magnetic disk 12 than the second peripheral wall 126. The first adsorbent 112 adsorbs substances from the airflow. Owing to the higher rate of adsorption, the first adsorbent 112 can efficiently adsorb the substances from the airflow. On the other hand, the FPC 57 generally blocks airflow. Because of this, gas tends to flow at a relatively slow rate around the second adsorbent 122. In spite of the lower rate of adsorption, the second adsorbent 122 can sufficiently adsorb substances from airflow having a lower flow rate. As such, the first adsorbent 112 and the second adsorbent 122 can adsorb substances in an efficient manner on the whole.

The first adsorbent 112 adsorbs moisture. The second adsorbent 122 adsorbs organic substances including gases. For example, the internal space SI may be filled with a gas such as helium through the vent 31. In this case, the first adsorbent 112 can adsorb moisture from the gas. In addition, at the time of drying the first adsorbent 112, the moisture of the first adsorbent 112 can be discharged to the outside through the vent 31.

The inner cover 22 is provided with a vent 32 communicating with the second accommodation space SC2. This allows the HDD 10 to selectively open the vent 31 and the vent 32 to the outside depending on the type of a process concerned. For example, in the drying process of the internal space SI, the vent 31 is opened to be able to discharge moisture from the first adsorbent 112 to the outside through the vent 31. For filling the internal space SI with a gas such as helium, the vent 32 is opened. The second adsorbent 122 can adsorb gas such as a contaminant gas from the helium to avoid the contaminant gas from flowing into the internal space SI.

A seal 36 is attached to the inner cover 22 outside the internal space SI to close the vent 32 in an airtight manner. As a result, the HDD 10 according to the present embodiment can avoid or restrict the second adsorbent 122 from being exposed to ambient air through the vent 32.

Modification

In the first embodiment, the first adsorbent 112 is silica gel as a moisture absorbent, and the second adsorbent 122 is activated carbon as a gas adsorbent. However, the first adsorbent 112 and the second adsorbent 122 are not limited to this example.

The moisture absorbent is, for example, silica gel, activated carbon, quicklime (CaO), or molecular sieve. The gas adsorbent that adsorbs a gas is, for example, a deoxidizing agent, activated carbon, or zeolite. Note that the moisture absorbent and the gas adsorbent are not limited to this example.

A dealumination action occurs in zeolite due to moisture. For example, when the first adsorbent 112 is silica gel and the second adsorbent 122 is zeolite, the silica gel and the zeolite are separated from each other. Because of this, the HDD 10 can avoid or reduce the situation that the moisture adsorbed by the silica gel causes dealuminization of the zeolite.

Second Embodiment

Hereinafter, a second embodiment will be described with reference to FIGS. 4 and 5. Note that, in describing a plurality of embodiments below, components having functions similar to those of the already-described components will be denoted by the same reference signs as the already-described components, and further description thereof may be omitted. In addition, the plurality of components denoted by the same reference sign do not necessarily have functions and properties all of which are common between the embodiments, and may have different functions and properties in the respective embodiments.

Figure 4:
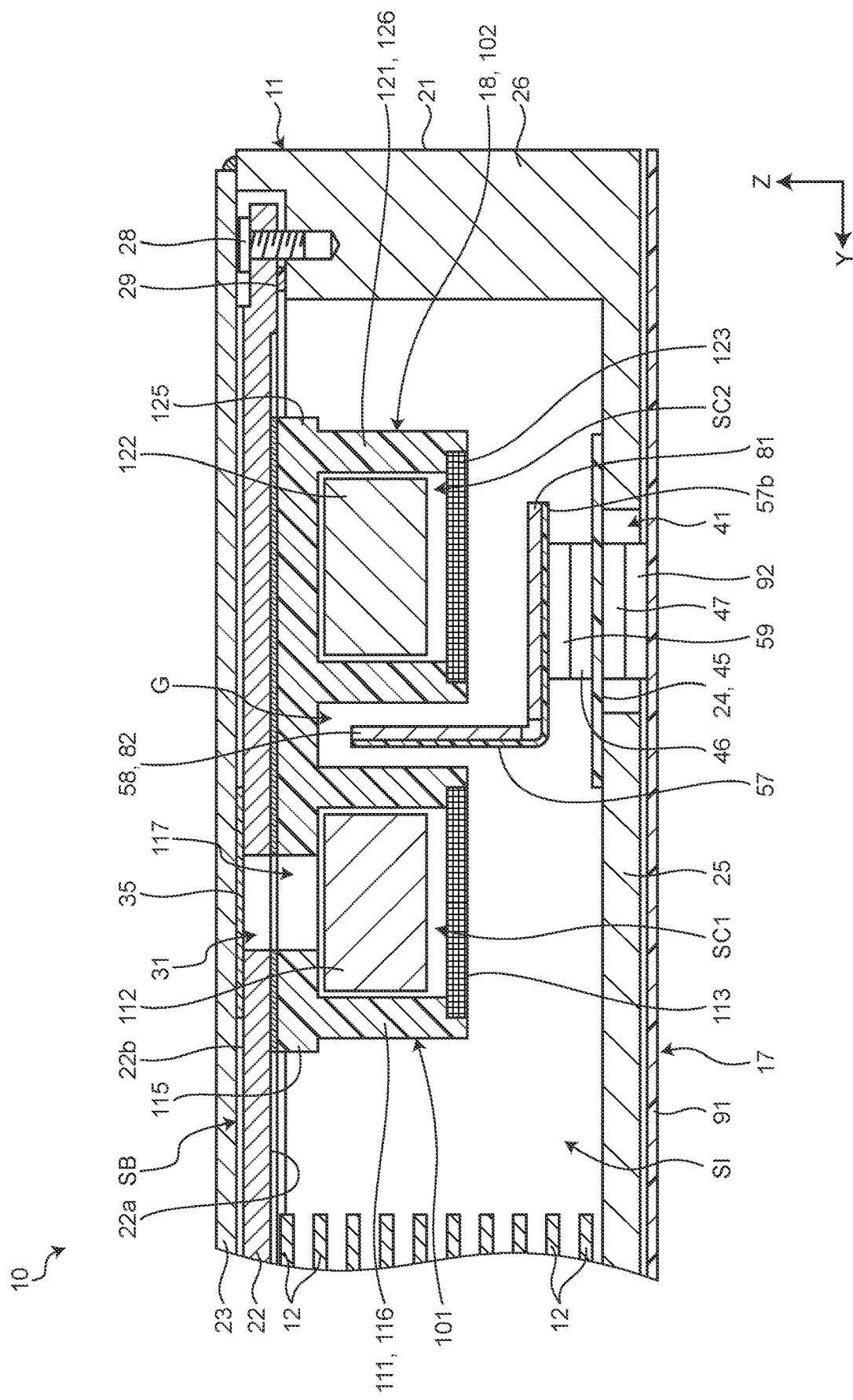
FIG. 4 is an exemplary cross-sectional view illustrating a part of an HDD according to a second embodiment.

FIG. 4 is an exemplary cross-sectional view illustrating a part of an HDD 10 according to the second embodiment. As illustrated in FIG. 4, in the second embodiment, the inner cover 22 is not provided with the vent 32, and the second base 125 is not provided with the second communication hole 127. That is, the vent 32 and the second communication hole 127 are provided as necessary. Note that the vent 32 and the second communication hole 127 may be provided in place of the vent 31 and the first communication hole 117.

The second accommodation space SC2 communicates with the internal space SI through the second filter 123, but does not communicate with the space SB or the outside of the housing 11. In other words, the second case 121 does not allow the second accommodation space SC2 to communicate with the outside of the internal space SI. the inner cover 22 is provided with only the vent 31 between the vent 31 communicating with the first accommodation space SC1 and the vent 32 communicating with the second accommodation space SC2.

In the second embodiment, the first adsorbent 112 is activated carbon and the second adsorbent 122 is molecular sieve. Note that the specific examples of the first adsorbent 112 and the second adsorbent 122 are not limited thereto. The adsorption action of the first adsorbent 112 is regenerable. On the other hand, the adsorption action of the second adsorbent 122 is non-regenerable at 80° C. or lower.

The molecular sieve can regenerate the adsorption action by being heated to 300° C. or higher. However, the heat resistant temperature of at least one of the various components such as the magnetic disks 12, the spindle motor 13, the HSA 14, the VCM 15, the ramp load mechanism 16, and the PCB 17 is lower than 300° C. Therefore, after the HDD 10 is assembled, it is difficult to reproduce the adsorption action of the second adsorbent 122 while maintaining the performance of the HDD 10.

Hereinafter, a part of a method for manufacturing the HDD 10 according to the second embodiment will be exemplified. Note that the method for manufacturing the HDD 10 is not limited to the method to be described below, and another method may be used. First, the plurality of magnetic disks 12, the spindle motor 13, the HSA 14, the VCM 15, and the ramp load mechanism 16 are accommodated in the internal space SI.

FIG. 5 is an exemplary cross-sectional view partially illustrating the inner cover 22 before being attached to the base 21 and the breather filter 18 in the second embodiment. As illustrated in FIG. 5, before the inner cover 22 is attached to the base 21, a seal 201 covering the second filter 123 is attached to the second filter unit 102 in advance.

The seal 201 is, for example, an aluminum seal. The seal 201 covers the second filter 123 to airtightly close the second accommodation space SC2. Therefore, the second case 121 and the seal 201 isolate the second accommodation space SC2 from the outside to suppress exposure of the non-regenerable second adsorbent 122 to outside air.

Next, the seal 201 is peeled off from the second filter unit 102, and the inner cover 22 is attached to the base 21. That is, the seal 201 is peeled off from the second filter unit 102 immediately before the inner cover 22 is attached to the base 21. Note that, as a means for protecting the non-regenerable second adsorbent 122 until immediately before the inner cover 22 is attached to the base 21, for example, a means described in Japanese Patent Application Laid-Open No. 2022-180054 can also be applied.

Next, the seal 35 is peeled off from the inner cover 22, and the air in the internal space SI is removed. Furthermore, the internal space SI is filled with helium, and the seal 35 is attached to the inner cover 22. As a result, the vent 31 is sealed by the seal 35. Next, the outer cover 23 is attached to the base 21. In this manner, the manufacture of the HDD 10 is completed.

The first adsorbent 112 may be dried while manufacturing the HDD 10 or while inspecting or repairing the HDD 10. In this case, the seal 35 is peeled off from the inner cover 22 while the outer cover 23 is not attached to the base 21. Then, the HDD 10 is heated to about 80° C. or lower. The temperature of the HDD 10 is set to lower than the lowest one among the heat resistant temperatures of various components such as the magnetic disks 12, the spindle motor 13, the HSA 14, the VCM 15, the ramp load mechanism 16, and the PCB 17.

The activated carbon as the first adsorbent 112 releases adsorbed moisture by being heated. The moisture is discharged from the first adsorbent 112 to the outside through the vent 31. When the first adsorbent 112 is sufficiently dried, the seal 35 is attached to the inner cover 22. Note that, without the vent 32, the non-regenerable second adsorbent 122 is hardly exposed to outside air even while the first adsorbent 112 is being dried.

In the HDD 10 according to the second embodiment described above, the first adsorbent 112 has a regenerable adsorption action. The second adsorbent 122 has a non-regenerable adsorption action. The regenerable first adsorbent 112 can be open to the outside through the vent 31. As such, the moisture of the first adsorbent 112 when dried can be discharged to the outside through the vent 31. On the other hand, the non-regenerable second adsorbent 122 is not open to the outside and can be thus prevented from being broken through or saturated.

In addition, before the assembly of the HDD 10, for example, the second filter 123 can be closed by an aluminum seal such as the seal 201. In the HDD 10 according to the present embodiment, it is possible to adjust the timing at which the second adsorbent 122 is exposed to ambient air by peeling off the seal 201 from the second filter 123 at a desired timing. As such, the HDD 10 can avoid or reduce the situation that the second adsorbent 122 is broken through or saturated.

The second case 121 does not allow the second accommodation space SC2 to communicate with the outside of the internal space SI. As a result, the HDD 10 can avoid or restrict the second adsorbent 122 from being exposed to ambient air, leading to prevent the breakthrough or saturation of the second adsorbent 122.

Third Embodiment

Hereinafter, a third embodiment will be described with reference to FIG. 6. FIG. 6 is an exemplary cross-sectional view illustrating a part of an HDD 10 according to the third embodiment. As illustrated in FIG. 6, the first case 111 has a first base 301 instead of the first base 115. Further, the second case 121 has a second base 302 instead of the second base 125. The first base 301 and the second base 302 are substantially identical to the first base 115 and the second base 125, except what will be described below.

The first base 301 and the second base 302 are separated from each other. That is, the first case 111 and the second case 121 are separated from each other. Because of this, the first case 111 and the second case 121 can be individually attached to the inner cover 22.

In the HDD 10 according to the third embodiment described above, the first case 111 and the second case 121 are separated from each other. As a result, the HDD 10 according to the present embodiment can provide more flexible arrangement of the first filter unit 101 and the second filter unit 102 in the internal space SI.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a magnetic disk;
a housing including
a base provided with an internal space in which the magnetic disk is accommodated, and
a first cover provided with a first through hole and attached to the base to close the internal space;
a first filter unit including
a first case provided with a first accommodation space which is in communication with the first through hole,
a first adsorbent disposed in the first accommodation space, and
a first filter attached to the first case attached to the first cover in the internal space,
the first filter through which the first accommodation space is in communication with the internal space;
a second filter unit including
a second case provided with a second accommodation space which is separated from the first accommodation space,
a second adsorbent disposed in the second accommodation space, and
a second filter attached to the second case attached to the first cover in the internal space, the second filter through which the second accommodation space is in communication with the internal space; and
a flexible printed circuit board located in the internal space, wherein
the first case has a first wall surrounding the first adsorbent,
the second case has a second wall surrounding the second adsorbent and separated from the first wall with a gap, and
the flexible printed circuit board is partially located in the gap.

2. The disk device according to claim 1, wherein
the first adsorbent and the second adsorbent are different kinds of adsorbents.

3. The disk device according to claim 1, wherein
the internal space is filled with a first gas being different from air.

4. The disk device according to claim 3, wherein
the housing further includes a second cover attached to the base to cover the first cover, and
the second cover closes a space between the second cover and the first cover in an airtight manner.

5. The disk device according to claim 3, further comprising:
a first seal attached to the first cover outside the internal space to close the first through hole in an airtight manner.

6. The disk device according to claim 1, wherein
the first case is provided with a first communication hole that allows the first through hole and the first accommodation space to communicate with each other, and
the first filter includes a first membrane filter.

7. The disk device according to claim 1, wherein
the first case and the second case are integrated together.

8. The disk device according to claim 1, wherein
the first case and the second case are separated from each other.

9. The disk device according to claim 1, wherein
the first wall is located between the magnetic disk and the flexible printed circuit board,
the flexible printed circuit board is located between the first wall and the second wall, and the first adsorbent has a higher rate of adsorption than the second adsorbent.

10. The disk device according to claim 1, wherein
the first adsorbent adsorbs moisture, and
the second adsorbent adsorbs a second gas.

11. The disk device according to claim 10, wherein
the first cover is provided with a second through hole which is in communication with the second accommodation space.

12. The disk device according to claim 11, further comprising:
a second seal attached to the first cover outside the internal space to close the second through hole in an airtight manner.

13. The disk device according to claim 11, wherein
the second case is provided with a second communication hole that allows the second through hole and the second accommodation space to communicate with each other, and
the second filter includes a second membrane filter.

14. The disk device according to claim 1, wherein
the first adsorbent has a regenerable adsorption action, and
the second adsorbent has a non-regenerable adsorption action.

15. The disk device according to claim 14, wherein
the second case does not allow the second accommodation space to communicate with an outside of the internal space.

\* \* \* \* \*